2,928,606
SOLAR THERMOSTAT CONTROL UNIT

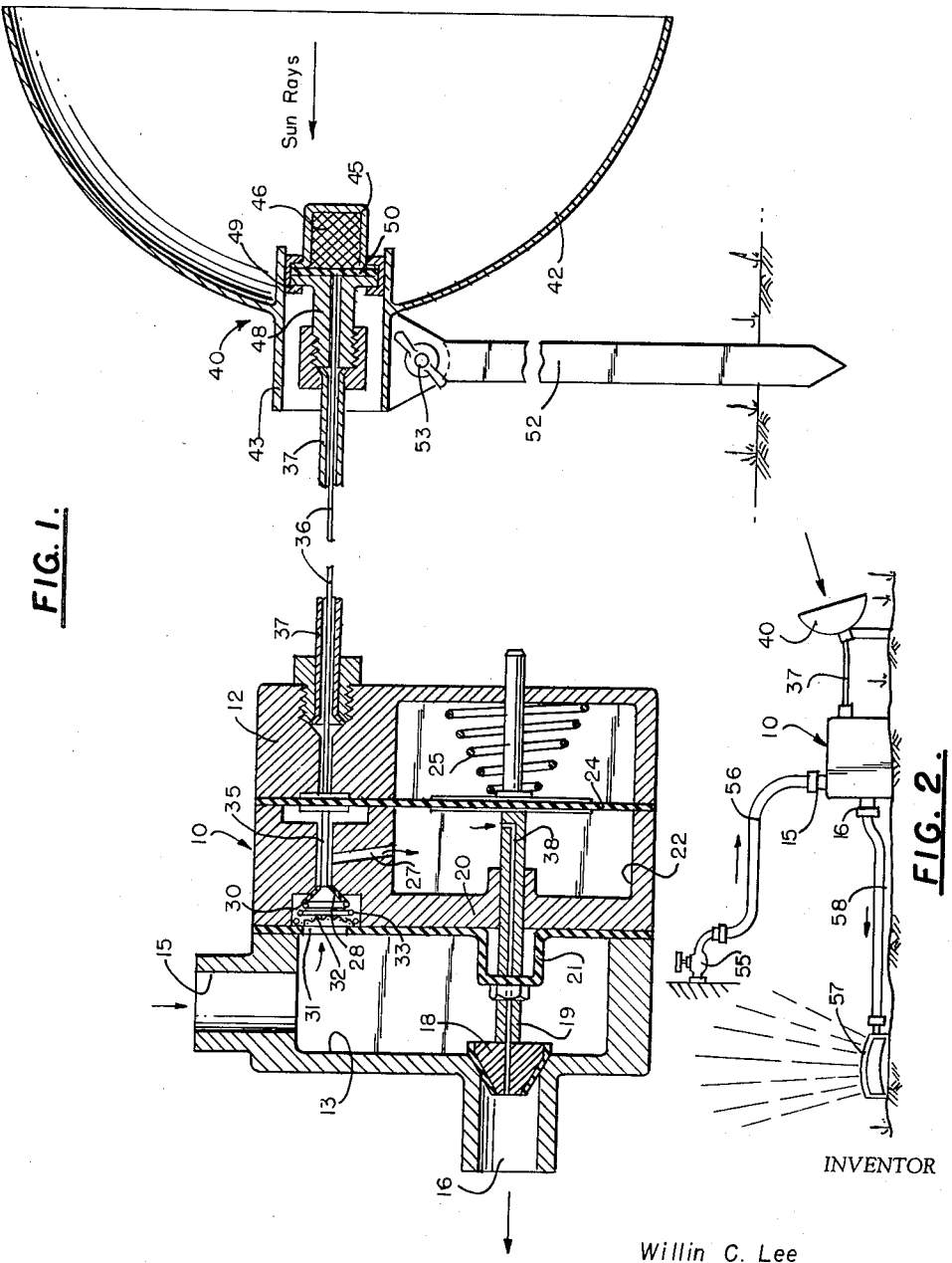
March 15, 1960 — W. C. LEE — 2,928,606
SOLAR THERMOSTAT CONTROL UNIT
Filed Aug. 30, 1957
INVENTOR
Willin C. Lee

United States Patent Office

Willin C. Lee, Melvindale, Mich.

Application August 30, 1957, Serial No. 681,232

6 Claims. (Cl. 239—67)

This invention relates to automatic control systems and more particularly to a thermostat control unit for water supply systems.

It is an object of the present invention to provide a control unit that is responsive to the radiation of heat, such as the rays of the sun for automatically controlling the supply of water to a water sprinkler or irrigation system.

It is another object of the present invention to provide a control unit of the above type which is adapted to permit the discharge of water through the irrigation means in response to the intensity of the rays of the sun in the vicinity of the irrigation apparatus.

Other objects of the invention are to provide a thermostat control unit bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a longitudinal cross sectional view of a thermostatic control system made in accordance with the present invention; and Figure 2 is a schematic diagram showing the manner in which the control system is connected to the irrigation equipment.

Referring now more in detail to the drawing, a solar thermostatic control system made in accordance with the present invention is shown to include a control valve unit 10 that has a housing 12 defining a water storage chamber 13. This chamber is provided with an inlet port 15 and an outlet port 16, which outlet port is normally closed by means of an outlet control valve plunger 18 carried at one end of a longitudinally reciprocating rod 19. This rod passes through a medial wall 20 within the chamber 13 which defines a secondary control valve chamber 22 on the other side thereof. The rod 19 passes through a gasket 21 that prevents the passage of water from one chamber to another.

The opposite extremity of the rod 19 is connected to the central portion of a flexible diaphragm 24 that extends across the secondary control valve chamber 22. A coil spring 25 acting against the adjacent end of the rod 19 normally biases the outlet control valve plunger head 18 into closing engagement with the outlet water storage chamber 13. However, in response to the admission of water to the secondary control valve chamber 22 under pressure from the inlet port 27 on the front side of the diaphragm, sufficient pressure is available to urge the diaphragm 24 and connected rod 19 in a rearward direction against the action of the spring 25 to effect the opening of the valve plunger head 18 to permit water to pass outwardly through the outlet port 16 of the valve unit from the inlet port 15. This outlet port 27 is in communication with the main water supply inlet port 15 through a secondary valve opening 28 that is controlled by a valve plunger 30. The inlet 31 between the valve opening 28 and water inlet 15 is partially closed by a filter screen 32 which prevents the entry of foreign matter into the secondary control valve chamber 22. The spring 33 acting against the valve plunger 30 normally maintains the secondary valve in a closed position thus preventing the entry of pressurized flow into the secondary valve chamber 22. However, the valve rod 35 is connected to the adjacent portion of the flexible diaphragm 24, which also has one end of a connecting rod 36 secured to the opposite side thereof so that the valve rod 35 and connecting rod 36 are virtually connected together for reciprocating longitudinal movement. Thus, in response to a compressive force upon the connecting rod 36, the secondary valve is caused to open against the action of the spring 33 to permit pressurized water to enter the secondary valve chamber 22 through the inlet 27 to effect movement of the main portion of the diaphragm 24 against the action of the spring 25 to retract the main control valve plunger head 18 out of closing engagement with the outlet 16 to permit water to pass directly through the water storage chamber 13 from the water supply inlet 15 to the water outlet 16. Removal of the compressive force upon the connecting rod 26 is thus adapted to close the secondary valve 30, whereupon the pressurized fluid within the secondary valve chamber 22 will slowly pass outwardly through a bleed port 38 in the valve rod 19 to the outlet 16, thus reducing the pressure within the chamber 22 and permitting the spring 25 to urge the rod 19 and valve plunger head 18 back toward the initial closing position so that water flow to the outlet 16 is cut off.

A thermo expansive control unit 40 is provided to control the movement of the connecting rod 36. This unit 40 includes a parabolic shaped reflector 42 having a centrally located core 43 within which a heat absorber unit 45 is mounted. This heat absorber includes a central mass 46 of thermo expansion material and is mounted within an annular flange 49. A gasket 50 also mounted within the flange 49 separates the material mass 46 from the adjacent end of a socket 48 through which the connecting rod 36 extends. An enclosure tube 37 completely encloses the entire length of the connecting rod 36 and thus fixes the distance between the adjacent ends of the control valve unit 10 and the thermo expansive control unit 40. It will now be recognized that in response to expansion of the mass of material 46 of the absorber 45, an outward force will be exerted against the end of the connector rod 36 that is in abutment with the gasket 50 so as to effect movement thereof relative to the enclosure tube 37. This relative movement thus effects the opening of the secondary control valve 30 in the manner hereinbefore explained.

A ground engaging stake 52 is adjustably connected by means of a joint 53 to the core 43 of the thermo expansive unit 40. It is thus possible to tilt the reflector 42 to any desired angle so as to concentrate the rays of the sun upon the absorber 45. The parabolic shape of the reflector facilitates the focusing of the sun rays.

As is more clearly shown in Figure 2, the valve unit 10 and thermo control unit 40 are placed adjacent to the sprinkler 57 or other irrigation equipment that has a connecting hose 58 extending from the water outlet 16 to the inlet of the irrigation equipment. The inlet of the valve unit 10 is connected to a manually controlled water supply valve 55 by means of a similar flexible hose 56. Once the unit has been set up, the supply of water to the irrigation equipment is automatically controlled by the intensity of the heat of the sun so that no further adjustments are necessary.

While various changes may be made in the detail construction, it shall be understood that such changes shall

What I claim as new and desire to protect by Letters Patent of the United States is:

1. A solar thermostat sprinkler control system comprising, in combination, a control valve unit, said valve having a pressurized water inlet and pressurized water outlet, means connecting said pressurized water inlet of said valve unit to a pressurized water source, means connecting said pressurized water outlet of said valve unit to irrigation equipment, and heat radiation responsive means for controlling the flow of pressurized water through said control valve unit from said inlet to said outlet, said heat radiation responsive means comprising a relatively small compact mass of thermal expansion material and a relatively large curved reflector for concentrating solar rays onto said material.

2. Irrigation mechanism comprising a land sprinkler; a source of pressurized water; valve means between said source and said sprinkler; heat responsive power means for opening and closing said valve means to control flow of water to the sprinkler; said power means comprising a cup-like casing and guide sleeve extended therefrom, thermally expansible material sealed within said cup-like casing, and a rod slidably extended within said sleeve in pressure communication with said expansible material; an operative connection between said rod and valve means for translating reciprocal movement of the rod into opening and closing movements of the valve means; and a parabolic reflector positioned to concentrate solar rays onto the cup-like casing for causing sufficient heat to be developed to expand the expansible material.

3. Irrigation mechanism comprising a land sprinkler; a source of pressurized water; valve means between said source and said sprinkler; heat responsive power means for opening and closing said valve means to control flow of water to the sprinkler; said power means comprising a casing structure and guide sleeve extended therefrom, thermally expansible material sealed within said casing structure, and a rod slidably extended within said sleeve in pressure communication with said expansible material; an operative connection between said rod and valve means for translating reciprocal movement of the rod into opening and closing movements of the valve means; and an arcuate reflector positioned to concentrate solar rays onto the casing structure for causing sufficient heat to be developed to expand the expansible material.

4. Irrigation mechanism comprising a land sprinkler; a source of pressurized water; valve means between said source and said sprinkler; heat responsive power means for opening and closing said valve means to control flow of water to the sprinkler; said power means comprising a relatively small casing structure, thermal expansion material within said casing structure, and deformable wall means sealing said material within the casing structure and movable in response to material expansion; force-translating means between said deformable wall means and valve means for translating movement of the expansion material into opening and closing movements of the valve means; and a relatively large parabolic reflector positioned with its focal point located at the casing structure to concentrate solar rays onto said casing structure for causing sufficient heat to be developed to expand the expansion material.

5. Irrigation mechanism comprising a land sprinkler; a source of pressurized water; valve means between said source and said sprinkler; heat responsive power means for opening and closing said valve means to control flow of water to the sprinkler; said power means comprising a cup-like casing, thermal expansion material within said casing, and deformable wall means sealing said material within the casing and movable in response to material expansion; force-translating means between said deformable wall means and valve means for translating movement of the expansion material into opening and closing movements of the valve means; and a reflector positioned to concentrate solar rays onto the cup-like casing for causing sufficient heat to be developed to expand the expansion material.

6. Irrigation mechanism comprising a land sprinkler; a source of pressurized water; valve means between said source and said sprinkler; heat responsive power means for opening and closing said valve means to control flow of water to the sprinkler; said power means comprising a cup-like casing, thermal expansion material within said casing, and deformable wall means sealing said material within the casing and movable in response to material expansion; force translating means between said deformable wall means and valve means for translating movements of the valve means; a reflector positioned to concentrate solar rays onto the cup-like casing for causing sufficient heat to be developed to expand the expansion material; ground-engageable support means; and a pivotal connection between said support means and the reflector-power means assembly for allowing said assembly to operate at different positions of the sun.

References Cited in the file of this patent

UNITED STATES PATENTS

| | | |
|---|---|---|
| 726,490 | Yerrington | Apr. 28, 1903 |
| 2,083,317 | Dallenbach | June 8, 1937 |
| 2,218,895 | Selig | Oct. 22, 1940 |
| 2,271,833 | Shipman et al. | Feb. 3, 1942 |
| 2,524,796 | Higgins | Oct. 10, 1950 |
| 2,774,343 | Schaffer et al. | Dec. 18, 1956 |
| 2,786,633 | Mayo | Mar. 26, 1957 |